United States Patent
Lockman et al.

(10) Patent No.: US 11,544,393 B2
(45) Date of Patent: Jan. 3, 2023

(54) SECURELY ACCESSING OFFLINE DATA WITH INDIRECT COMMUNICATION

(71) Applicant: Cold Fortress, Inc., Miami, FL (US)

(72) Inventors: Travis Lockman, Miami, FL (US); Hansel Fernandez, Castle Rock, CO (US)

(73) Assignee: Cold Fortress, Inc., Miami, FL (US)

( * ) Notice: Subject to any disclaimer, the term of this patent is extended or adjusted under 35 U.S.C. 154(b) by 592 days.

(21) Appl. No.: 16/517,021

(22) Filed: Jul. 19, 2019

(65) Prior Publication Data
US 2020/0065502 A1 Feb. 27, 2020

Related U.S. Application Data

(60) Provisional application No. 62/721,660, filed on Aug. 23, 2018.

(51) Int. Cl.
*G06F 21/60* (2013.01)
*H04L 9/40* (2022.01)
*G06F 9/48* (2006.01)

(52) U.S. Cl.
CPC .......... *G06F 21/606* (2013.01); *G06F 9/4806* (2013.01); *H04L 63/0876* (2013.01)

(58) Field of Classification Search
CPC ...... G06F 21/606; G06F 9/4806; G06F 21/44; G06F 21/60; G06F 21/62; G06F 21/6209; G06F 21/6218; H04L 63/0876; H04L 63/0209; H04L 63/0281; H04L 63/08; H04L 63/18; H04L 67/56; H04L 67/568
See application file for complete search history.

(56) References Cited

U.S. PATENT DOCUMENTS

| | | | |
|---|---|---|---|
| 7,243,367 B2 * | 7/2007 | Kleinsteiber | H04L 63/0869 713/169 |
| 8,521,934 B1 * | 8/2013 | Ni | G06F 13/385 710/110 |
| 8,522,309 B2 † | 8/2013 | Yoffe | |
| 8,924,708 B2 * | 12/2014 | Yoffe | G06F 21/85 713/152 |
| 2017/0262650 A1 * | 9/2017 | Patel | G06F 3/0622 |
| 2017/0323116 A1 * | 11/2017 | Mumford | H04L 9/3226 |
| 2017/0331709 A1 * | 11/2017 | Lam | H04L 43/0876 |

* cited by examiner
† cited by third party

*Primary Examiner* — Minh Dinh
(74) *Attorney, Agent, or Firm* — Schwegman Lundberg & Woessner, P.A.

(57) ABSTRACT

Discussed herein are devices, systems, and methods for secure access to offline data. A method can include configuring a device in a task retrieval state and retrieving a task to be executed on a cold storage device while the device is in the task retrieval state, configuring the device in a disconnected state after retrieving the task, and configuring the device in a task execution state after the device is in the disconnected state and executing the task on the cold storage while the device is in the task execution state. In the task retrieval state, the device can communicate with a buffer network and cannot communicate with a cold network. In the disconnected state, the device cannot communicate with either the cold network or the buffer network. In the task execution state, the device can communicate with the cold network and cannot communicate with the buffer network.

13 Claims, 8 Drawing Sheets

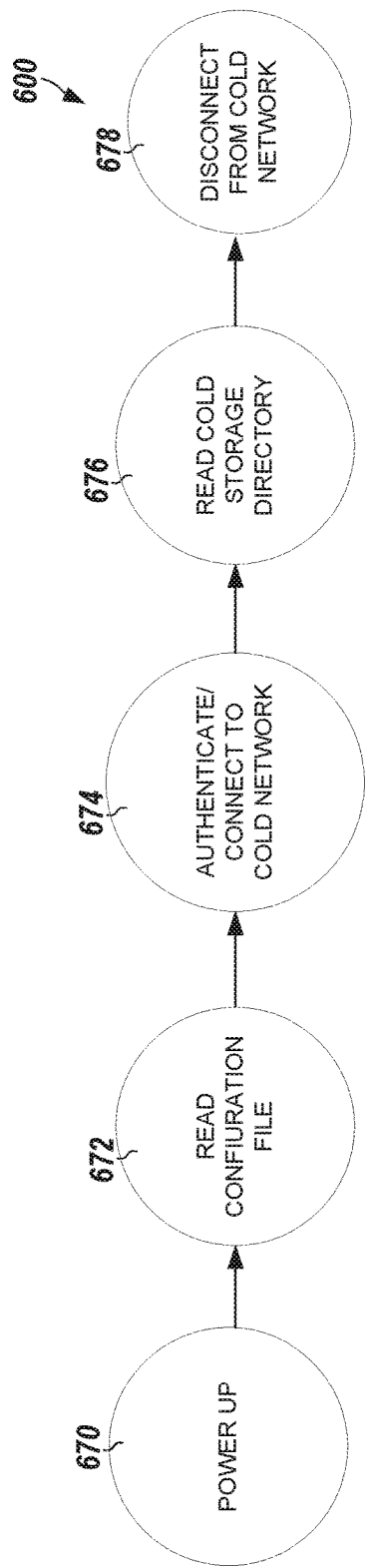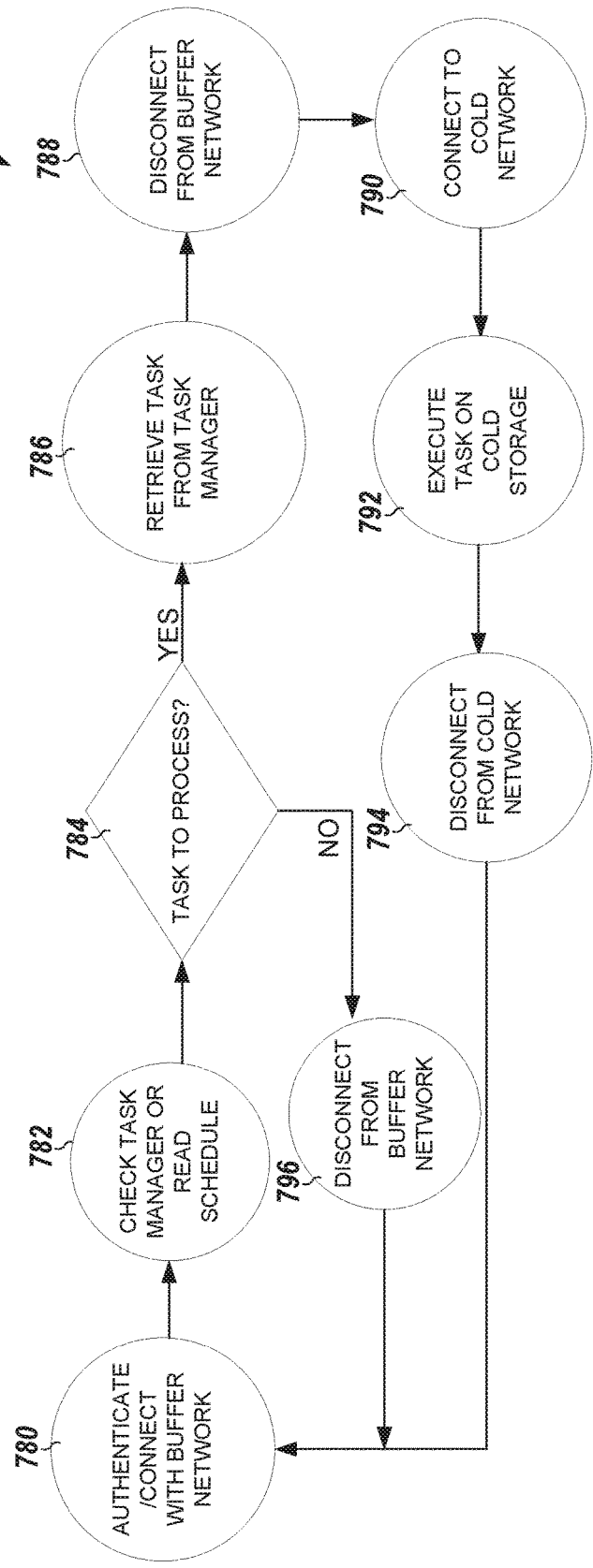

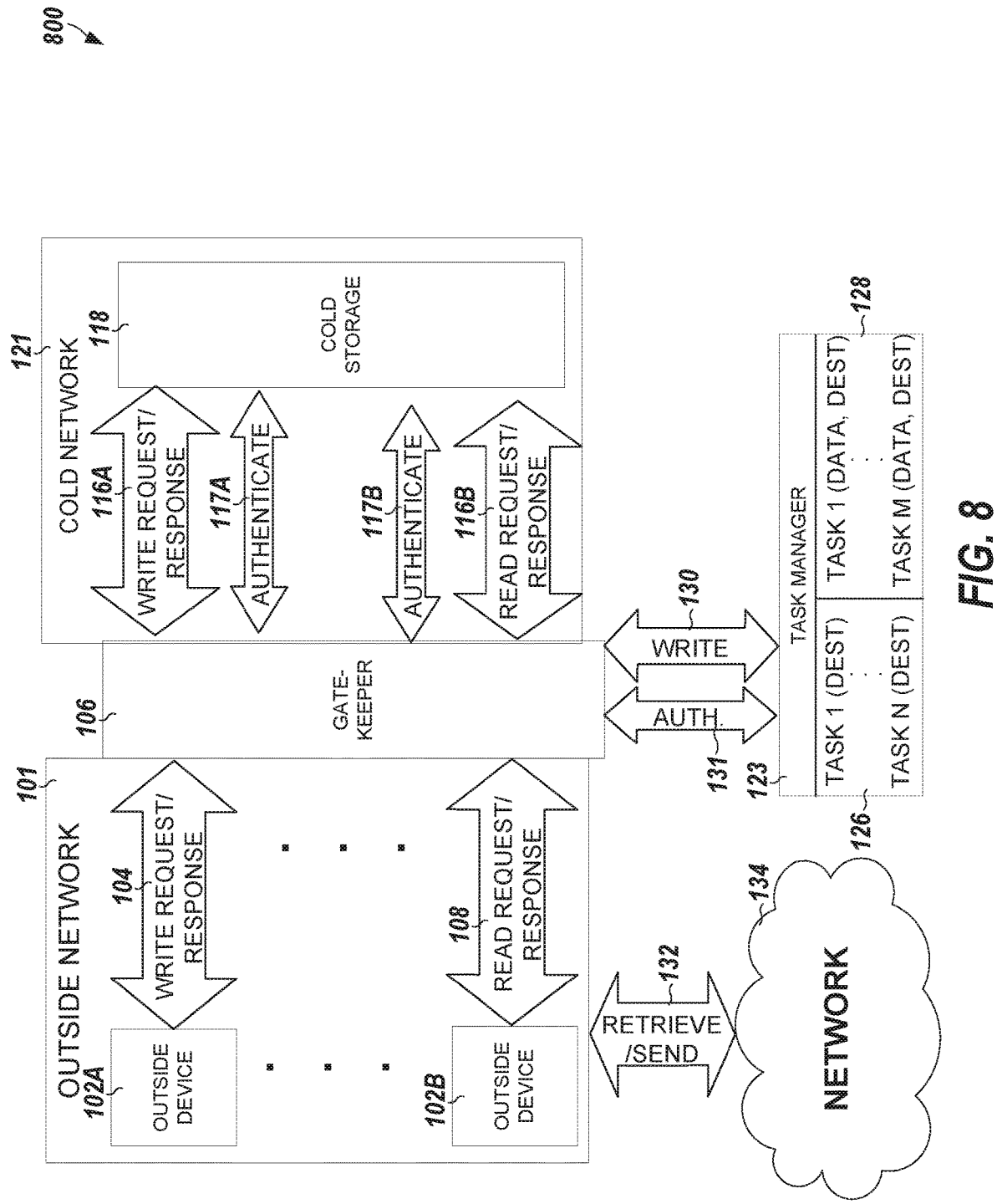

US 11,544,393 B2

SECURELY ACCESSING OFFLINE DATA WITH INDIRECT COMMUNICATION

RELATED APPLICATION

This application claims the benefit of priority to U.S. Provisional Patent Application Ser. No. 62/721,660, filed on Aug. 23, 2018, and titled "Securely Accessing Offline Data With Indirect Communication" which is incorporated herein by reference in its entirety.

TECHNICAL FIELD

This disclosure relates generally to cyber security. More specifically, this disclosure regards allowing a device of an outside network to store, retrieve, and access data stored in a device that is offline (e.g., not connected to the Internet or is only temporarily connected to a network) with no direct channel of communication between the device that is offline and the device of the outside network. The access can be secure, such that the outside network is never connected to the device and the device that is offline is never connected to an online device, while still allowing a device of the outside network to issue a task to be executed on the device that is offline.

BACKGROUND

Confidentiality, integrity and availability are the three pillars on which any network security posture is built. Accordingly, the transferring of data across any network must be secured at all times; whether in transit, at rest, or in use. Unfortunately, the inherent vulnerabilities created by allowing a network to be accessed online continue to outpace conventional security measures and protocols. As a result, online networks continue to be vulnerable to malicious cyberattacks and/or the leaking of confidential or otherwise sensitive information.

Most networks store information on infrastructure connected to the Internet. This information storage creates cyber security vulnerabilities. A cyber security vulnerability can include the ability to change stored information, unauthorized access to stored information, or the like.

Currently, there are solutions to store data online, offline, or in the cloud. The inventors are not aware of any technology for storing data that bridges these solutions. Embodiments herein maintain an offline storage repository, called "cold storage" or a "cold storage device" herein, while still allowing access to the data to a device of another network in a more secure manner.

BRIEF DESCRIPTION OF DRAWINGS

FIG. 6 illustrates, by way of example, a diagram of an embodiment of a method for initialization of a disappearing node.

FIG. 7 illustrates, by way of example, a diagram of an embodiment of a method for securely communicating with offline storage, such as the cold storage via at least one cold storage network.

FIG. 8 illustrates, by way of example, a diagram of an embodiment of another system for secure access to offline information.

DETAILED DESCRIPTION

Figure 1:
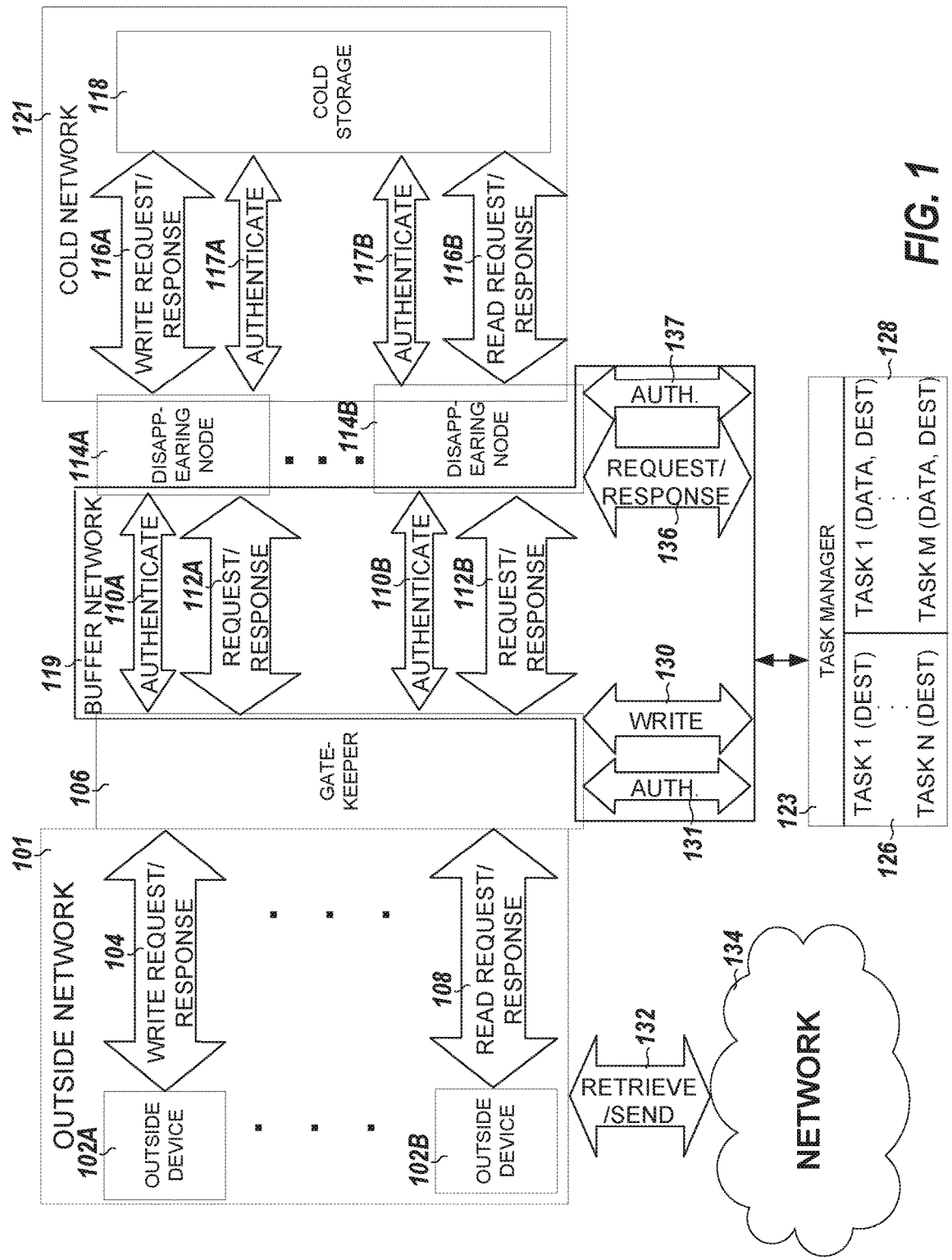
FIG. 1 illustrates, by way of example, a diagram of an embodiment of a system for secure online access to offline data.

In the following description, reference is made to the accompanying drawings that form a part hereof, and in which is shown by way of illustration specific embodiments which can be practiced. These embodiments are described in sufficient detail to enable those skilled in the art to practice the embodiments. It is to be understood that other embodiments can be utilized and that structural, logical, and/or electrical changes can be made without departing from the scope of the embodiments. The following description of embodiments is, therefore, not to be taken in a limited sense, and the scope of the embodiments is defined by the appended claims.

The operations, functions, or methods described herein can be implemented, in part, in software in some embodiments. The software can include computer executable instructions stored on computer or other machine-readable media or storage device, such as one or more non-transitory memories (e.g., a non-transitory machine-readable medium or data storage device) or other type of hardware-based storage devices, either local or networked as appropriate for the particular device. Further, operations, functions, or methods can correspond to subsystems, which can be software, hardware, firmware or a combination thereof. Multiple functions can be performed in one or more subsystems as desired, and the embodiments described are merely examples.

The software can be executed on a digital signal processor (DSP), ASIC, microprocessor, central processing unit (CPU), graphics processing unit (GPU), field programmable gate array (FPGA), or other type of processor operating on a computer system, such as a personal computer (PC), server or other computer system, turning such computer system into a specifically programmed machine. The functions or methods can be implemented using processing circuitry, such as can include electric and/or electronic components (e.g., one or more transistors, resistors, capacitors, inductors, amplifiers, modulators, demodulators, antennas, radios, current, voltage, or power regulators, diodes, oscillators, multiplexers, logic gates (e.g., AND, OR, XOR, or negate gates, or the like), analog to digital converters (ADCs), digital to analog converters (DACs), buffers, caches, memories, GPUs, CPUs, FPGAs, or the like).

Embodiments herein provide a way to securely store files in an offline storage (e.g., a storage device that is part of a cold network that is not connected to the Internet or another network or device external to the cold network) while still allowing a device that is part of an outside network (e.g., a network other than the cold network) to access the data stored in the offline storage in a more secure manner, such as to not expose the offline storage to the outside network.

The offline storage is sometimes called "cold storage" or a "cold storage device" herein. The network through which the device requests data from the cold storage is sometimes called an "outside network". The device of the outside network that requests data from the cold storage is sometimes called an "outside device". A network through which a gatekeeper communicates to gain access to a disappearing node is called a "buffer network". A network through which the disappearing node communicates to gain access to the cold storage is called a "cold network".

In general, embodiments operate using a device at a boundary of the outside network, called a "gatekeeper" herein, a buffer network between the outside network and the cold storage, the buffer network facilitates communication between the outside network and a worker node, called a "disappearing node" herein, and the disappearing node that communicates to cold storage through a cold network. Each of these devices, nodes, or networks has their own advantages and are useful on their own or in combination with one or more of the other devices, nodes, or networks.

Embodiments can digitally transfer data (e.g., files, packets, data streams, bits, or the like) from a first environment (e.g., an online network or an offline network) to an offline environment (e.g., the cold storage device of a cold network), such as from an outside network to a cold network. The transfer can occur with less latency than an air-gap solution. Most air-gap solutions require a human to retrieve the desired data and load the data for access by the first environment. Embodiments can provide on-demand access. Embodiments can operate by using a handoff between one or more gatekeepers (over a buffer network), and one or more "disappearing" nodes. This can provide the security inherent in an offline environment while maintaining nearly the same, or the same, accessibility of an online environment.

Embodiments can provide one or more advantages over previous cyber security solutions, such as can include one or more of: (i) providing online access to offline (or "cold") storage; (ii) reducing data exposure to online attacks; (iii) mitigating damage of a hypothetical breach by using temporary, synchronized, scheduled or unscheduled handoffs between the gatekeeper or disappearing nodes (over a buffer network), such as via one or more task managers. A task manager can include a task memory (e.g., a queue, server, or the like) or other storage medium to organize and store task data.

Reference will now be made to the FIGS. to describe further details of some embodiments. Not all the details of the FIGS. are needed in all embodiments, and some embodiments can operate without one or more of the details. Further, aspects of embodiments can be combined with aspects of other embodiments to form an operable solution.

FIG. 1 illustrates, by way of example, a diagram of an embodiment of a system 100 for secure online access to offline data. The system as illustrated includes an outside network 101, a gatekeeper 106, one or more disappearing nodes 114A and 114B, cold storage 118, a buffer network 119, a remote network 134, and a cold network 121.

The outside network 101 as illustrated includes outside devices 102A and 102B. The outside devices 102A-102B can include one or more computing devices (e.g., desktop computers, laptop computers, tablets, smartphones, or the like), printers, televisions, security devices (e.g., cameras, electronic locks, metal detectors, or the like), thermostats, telephones, or other devices capable of communicating with other devices of the outside network 101. The outside devices 102A-102B can communicate with a gatekeeper 106 with a write request 104 or a read request 108. The write request 104 or the read request 108 can include a data path (e.g., a query, filepath, file index, Uniform Resource Locator (URL), or the like) corresponding to the cold storage 118. The write request 104 can include data to be written to the destination address. Examples of write requests 104 include put, save, post, and patch, mput, or the like.

The outside device 102A-102B can access the network 134 (e.g., a remote network, the cloud, or the Internet), such as through a web browser on a user interface of the outside device 102A-102B. The communication between the network 134 and the outside device 102A-102B can include a retrieve or a send request 132. The outside device 102A-102B can access websites, electronic mail (email), data storage, or devices of the network 134.

The gatekeeper 106 can perform access control for communication between devices of the outside network 101 and the buffer network 119 or the cold network 121. The gatekeeper 106 can compare a destination of the write request 104 or the read request 108 to an array of destinations of the cold storage 118. The gatekeeper 106 can verify that the requesting outside device 102A-102B has sufficient permissions to access the destination. Permissions can include read permissions, write permissions, or read and write permissions, among others. The permissions can be verified by confirming a user of the outside device 102A-102B is associated with a profile type (e.g., user, admin, manager, etc.) that is allowed access to the corresponding destination. The permissions can be verified by further confirming a user of the outside device 102A-102B is in possession of a password, key, or the like, required to access the cold storage 118. The permissions can be at an individual user level or a group level. The permissions for access to different destinations on the cold storage 118 can be different. For example, permissions to access one destination of the cold storage 118 can just require the user of the outside device 102A-102B to be a member of the outside network 101, while permissions to access another destination of the cold storage 118 can require the user of the outside device 102A-102B to have administrator status and provide two-factor authentication. Many other permissions and authentication schemes exist, and embodiments are not limited to a specific permissions or authentication scheme. In one or more embodiments, permissions are only checked by the gatekeeper 106 and not other entities of the system 100 performs permissions checks.

The gatekeeper 106 can facilitate communication between a device of the outside network 101 and the cold storage 118, such as through the buffer network 119. In one or more embodiments, the gatekeeper 106 can remain online (e.g., connected to another network 134 or the Internet, etc.) or be online intermittently. The gatekeeper 106 can issue a write command 130 to the task manager 123 (via the buffer network 119) that causes the task to be written to one or more task memories 126, 128. While the task manager 123 is illustrated as separate from the gatekeeper 106, the task manager 123 can be local to or part of the gatekeeper 106 in one or more embodiments.

In the embodiment illustrated in FIG. 1, the task manager 123 includes a read memory 126 and a write memory 128. The read memory 126 includes read tasks to be executed by the disappearing node 114A-114B on the cold storage 118. The write memory 128 includes write tasks to be executed by the disappearing node 114A-114B on the cold storage 118. While the embodiment illustrates two memories, more or fewer memories can be used. Further, the read tasks and the write tasks can be combined in a single memory. The embodiment illustrated is merely an example of a configuration of a task manager.

The read memory 126 and the write memory 128, as previously discussed, can include tasks to be executed by the disappearing node 114A-114B on the cold storage 118. Tasks of the task manager 123 can be organized or indexed in a variety of manners. For example, the memory 126, 128 can include a first in first out (FIFO) queue architecture, a last in first out (LIFO) queue architecture, or a prioritized architecture in which each task includes a priority value. In a FIFO architecture, tasks are executed in a same order in which they are written to the queue. In a LIFO architecture, tasks are executed in an opposite order in which they are written to the queue. In a priority architecture, tasks with higher priority are executed before tasks with a lower priority. In case of a tie between priorities, a heuristic can be declared that determines which task with tied priority values will be executed. The heuristic can include, for example, the task that was written to the queue earlier in time can be executed first, the task can be further prioritized by user status such that a user with a higher permission status (higher in terms of level of access allowed, such as an administrator being higher priority than a read/write permission user, which is higher than a read only permission user), or many others. get, head The read tasks in the read memory 126 can indicate a destination of the cold storage 118 from which to retrieve data. The write tasks in the write memory 128 can indicate data to be written to an indicated destination.

The buffer network 119, in one or more embodiments, can include its own access controls. For example, the buffer network 119 can include a firewall through which access control can be implemented to police communications between the gatekeeper 106 or the disappearing node 114A-114B and the buffer network 119. In one or more embodiments, the gatekeeper 106 can help form a boundary of the buffer network 119.

Devices connected to the buffer network 119 can manage access to the memory 126, 128. In one or more embodiments, the gatekeeper 106 is the only device through which a device of the outside network 101 can access the buffer network 119. In one or more embodiments, the disappearing node 114A-114B can access the gatekeeper 106 through the buffer network 119. In one or more embodiments, the disappearing node 114A-114B is never coupled directly to the gatekeeper 106 such that no direct communication channel between the gatekeeper 106 and the disappearing node 114A-114B exists.

In one or more embodiments, the buffer network 119 is formed at, or around, the time the gatekeeper 106 is communicating with (or establishing communication with) the disappearing node 114A-114B or vice versa. In one or more embodiments, the buffer network 119 is formed at, or around, the time the gatekeeper 106 or disappearing node 114A-114B are communicating with (or establishing communication with) the task manager 123.

In the embodiment of FIG. 1, communication between the outside network 101 and the cold storage 118 must go through the disappearing node 114A-114B. In one or more embodiments, communication between the outside network 101 and the cold storage 118 must go through the gatekeeper 106 and the disappearing node 114A-114B. In one or more embodiments, communication between the outside network 101 and the cold storage 118 must go through the gatekeeper 106, the buffer network 119, and the disappearing node 114A-114B.

The disappearing node 114A-114B is an intermediary between the outside network 101, the gatekeeper 106, or the buffer network 119, and the cold storage 118. The disappearing node 114A-114B can authenticate with the gatekeeper 106, the cold network 121, or the buffer network 119, such as with an authentication request 110A, 110B, 117A, 117B, or 137. The authentication request 110A-110B, 117A-117B, or 137 can include an exchange of one or more keys (e.g., cryptographic or non-cryptographic keys), passwords, or other information required to satisfy access permission required by the gatekeeper 106, the buffer network 119, or the cold network 121.

The disappearing node 114A-114B can issue a request 112A, 112B, or 136 for a task in the memory 126 or 128 or data corresponding to the task from the gatekeeper 106 or the buffer network 119. The request 112A, 112B, and 136 can be for a task (a general request for a task), a task associated with a particular destination or destination(s) of the cold storage 118, a task from a specified memory (e.g., a memory of the task manager 123), a specified type of task (e.g., read or write), or the like.

The disappearing node 114A-114B is configured to only connect to the gatekeeper 106 or the buffer network 119 after it is disconnected from the cold storage 118. The disappearing node 114A-114B is configured to only connect to the cold storage 118 after it is disconnected from the gatekeeper 106 or the buffer network 119. The disappearing node 114A-114B can connect or disconnect from the gatekeeper 106 or the buffer network 119 using software or firmware that controls a physical state of a switch on a port. The state of the switch can include a closed state in which an electrical path is formed between devices connected thereto and an open state in which an electrical path is open (includes an "air gap") thus preventing electricity from flowing between the devices connected to the switch. Example commands for creating an open electrical path include "ifconfig eth0 down" in Linux or "netsh interface set interface "network_adapter_name" admin=disable" in Windows, others for other operating systems, or the like. By controlling the communication connections to the disappearing nodes 114A-114B or the buffer network 119, the disappearing nodes 114A-114B can "go dark" and the system 100 can go into a "blackout" mode where all disappearing nodes 114A-114B shutdown, and the gatekeeper 106 disconnects its connection to the outside network 101.

The authentication request 110A-110B, 131, 137, and 117A-117B can be performed on a different communication channel, sometimes called a "port", than the write command 130. Some communication channels can be more popular for hackers or otherwise less secure for data transfer. To help add security, the authentication can be performed over a separate communication channel than a request or data transfer. The authentication request 110A-110B, 131, 137, and 117A-117B can include a known or proprietary authentication protocol. Known authentication protocols include password, username, cryptographic or other key exchange or verification, such as asymmetric or symmetric encryption.

The disappearing node 114A-114B can include or be implemented using a computing device, such as can include dedicated hardware, a virtual machine, or the like.

The cold storage 118 includes data that is sensitive, confidential, proprietary, or otherwise desired to be protected for whatever reason. The cold storage 118 includes a memory device on which the data is stored. Memory devices include random access memory (RAM), read only memory (ROM), or the like. There are many varieties of memory storage techniques and architectures and the cold storage 118 is not limited to any specific technique or architecture except that the data of the cold storage 118 remains accessible to the disappearing node 114A-114B (e.g., an authenticated disappearing node 114A-114B) with an enabled communication channel to the cold storage 118. In one or more embodiments, the cold network 121 can verify that the disappearing node 114A-114B has no connections to the gatekeeper 106 or the buffer network 119 as part of the authentication request 117A-117B. Similarly, the buffer network 119 or the gatekeeper 106 can verify that the disappearing node 114A-114B has no connections to the cold network 121 as part of the authentication request 137 or 110A-110B.

The cold storage 118 can include a server, memory controller, or other device that controls access to the data stored thereon. In one or more embodiments, the cold storage 118 includes a firewall that polices communications or data into or out of the cold storage 118. The firewall, server, memory controller, or other device of the cold storage 118 can perform access control, such as to respond to or implement an authentication protocol corresponding to the authentication request 117A-117B.

The cold network 121 can be formed at, or around, the time the disappearing node 114A-114B is communicating (establishing communication) with the cold storage 118. The cold network 121 is never exposed to the buffer network 119, the gatekeeper 106, or the outside network 101, in the embodiment of FIG. 1.

Figure 2:
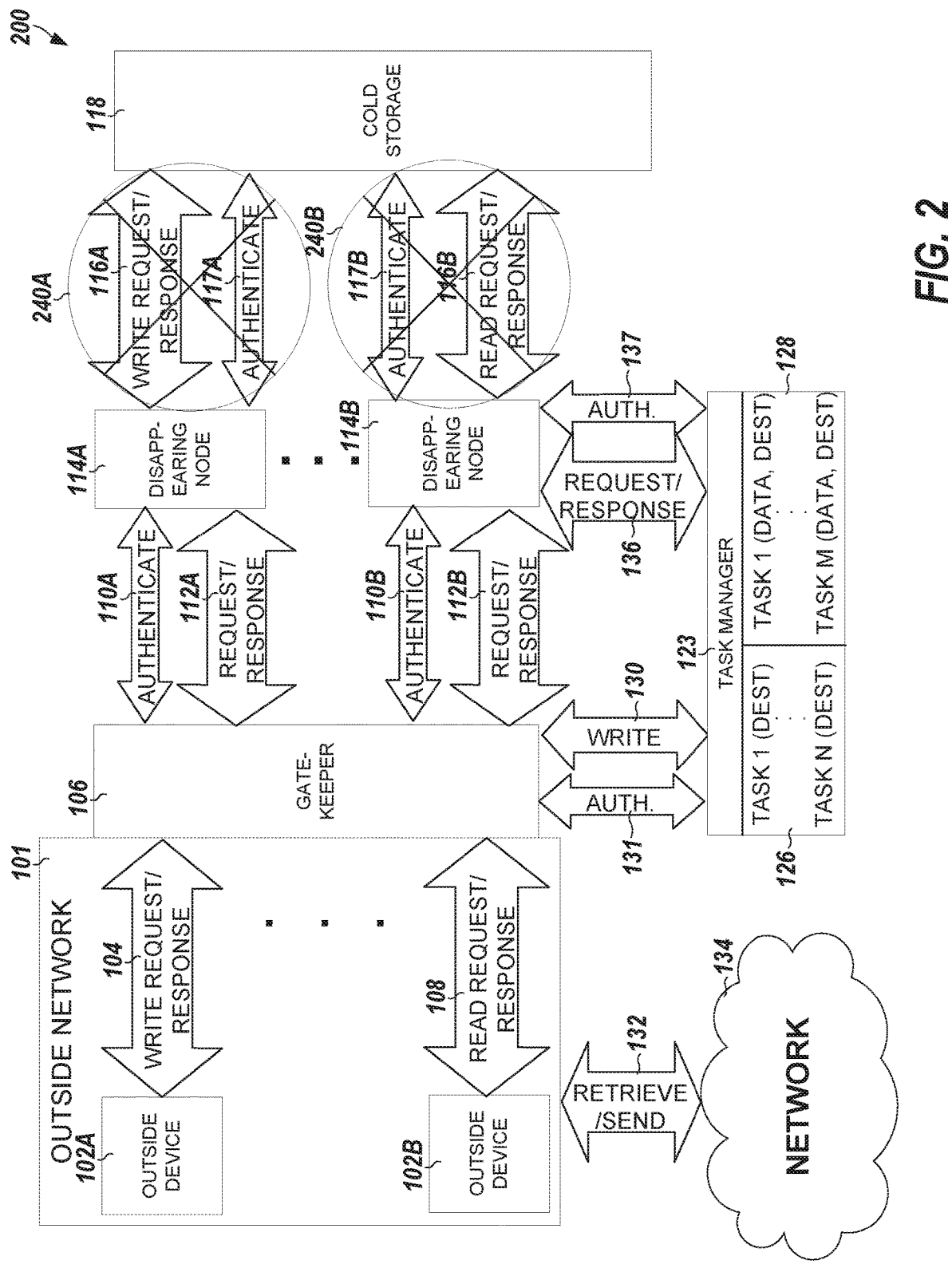
FIG. 2 illustrates, by way of example, a diagram of an embodiment of a system that includes the system in a task retrieval state.

FIG. 2 illustrates, by way of example, a diagram of an embodiment of a system 200 that includes the system 100 in a task retrieval state. The cold network 121 and the buffer network 119 are not illustrated in FIG. 2 so as to not obscure the view. See FIG. 1 for a view of these networks.

In the task retrieval state, the system 200 includes no communication channels between the cold storage 118 (the cold network 121) and the disappearing nodes 114A-114B, as indicated by the prohibited sign 240A and 240B. In the task retrieval state, the disappearing node 114A-114B includes one or more communication channels to the gatekeeper 106 or the buffer network 119. In the task retrieval state, the disappearing node 114A-114B can authenticate with the gatekeeper 106 or the buffer network 119, such as using the authentication request 110A-110B or 137. In the task retrieval state, the disappearing node 114A-114B can request a task to be performed on the cold storage 118, such as by issuing the request 112A-112B or 136. In one or more embodiments, a task in the memory 126 or 128 that has been assigned to or claimed by the disappearing node 114A-114B (e.g., by or through the gatekeeper 106 or the buffer network 119) can include an associated status of "pending" in the read memory 126, write memory 128, or a memory of the gatekeeper 106. In the task retrieval state, the disappearing node 114A-114B can issue a response 112A-112B or 136 to the gatekeeper 106 or the buffer network 119 indicating a status of the task assigned to the disappearing node 114A-114B. The response from the disappearing node 114A-114B, the gatekeeper 106, or the buffer network 119 can be issued on a same or different port as the request from the disappearing node 114A-114B. The response 112A-112B 136 can include an indication as to whether a corresponding task was successful (e.g., an acknowledge (ACK), or the like) or unsuccessful (e.g., negative ACK (NACK), or the like), and, in the case of a successful read task, data from the cold storage 118.

In some embodiments, one or more of the tasks in the memory 126, 128 can include a time to live (TTL). If a tasks TTL has expired, the task can be granted a new TTL or can be transferred to another task manager or memory that handles tasks that are not being executed in a timely manner. In some embodiments, the gatekeeper 106 or a device of the buffer network 119 can issue a keep alive command to allow the task to remain open at the outside device 102A-102B until it is successfully completed or has failed.

Figure 3:
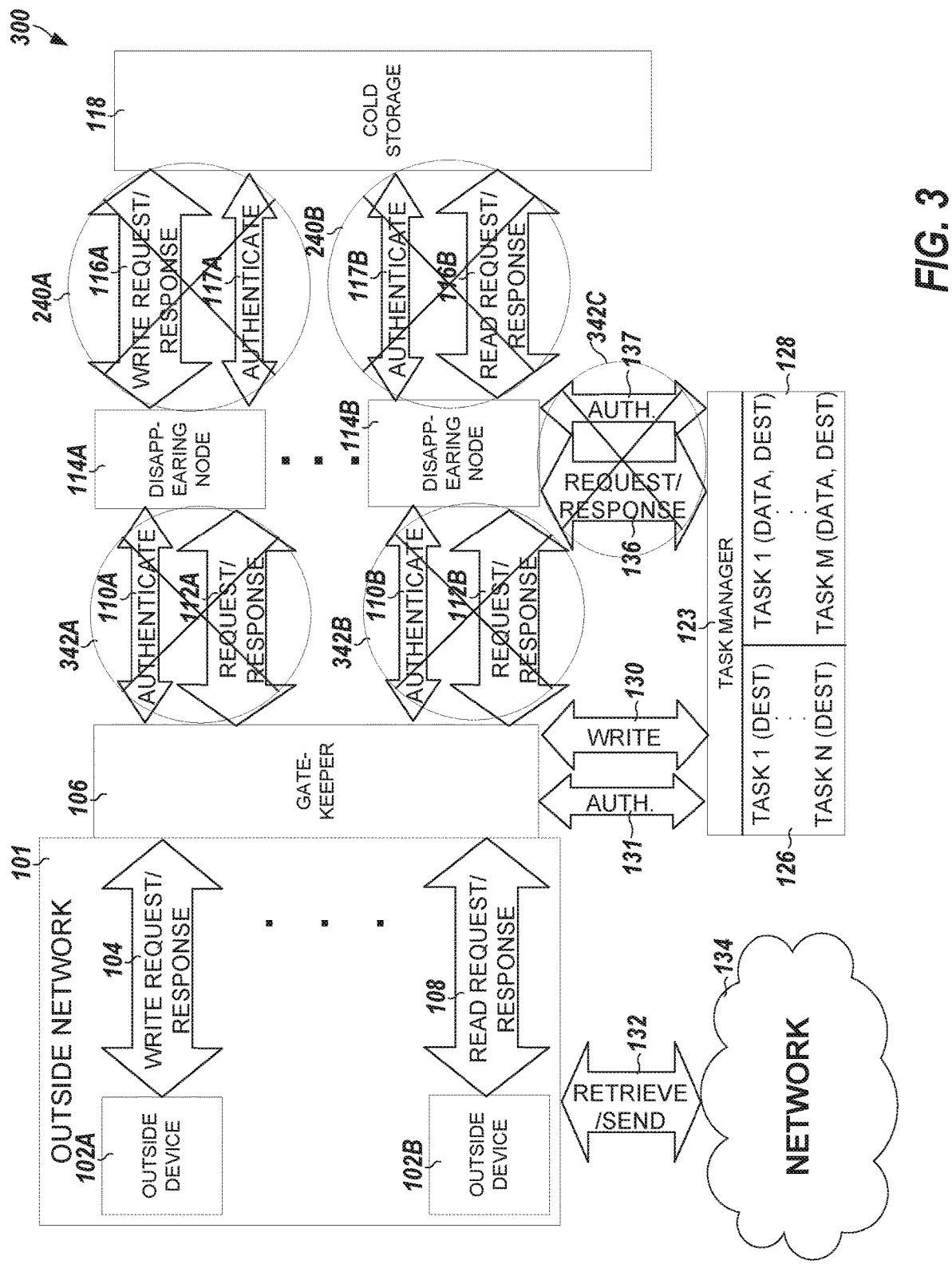
FIG. 3 illustrates, by way of example, a diagram of an embodiment of a system that includes the system in a disconnected state.

FIG. 3 illustrates, by way of example, a diagram of an embodiment of a system 300 that includes the system 100 in a disconnected state. The cold network 121 and the buffer network 119 are not illustrated in FIG. 3 so as to not obscure the view. See FIG. 1 for a view of these networks.

The disconnected state includes no physical connections to the disappearing node 114A-114B that are enabled as indicated by the prohibited signs 240A-240B, 342A, 342B, and 342C. Note that in some embodiments, the disappearing node is only connected to one of the gatekeeper 106 or the buffer network 119, and in such embodiments, only the connections need be disconnected. The disconnected state is temporary but can be important. The disconnected state is to help ensure that the cold storage 118 is never coupled to the outside network 101, such that the cold storage 118 always remains offline.

Figure 4:
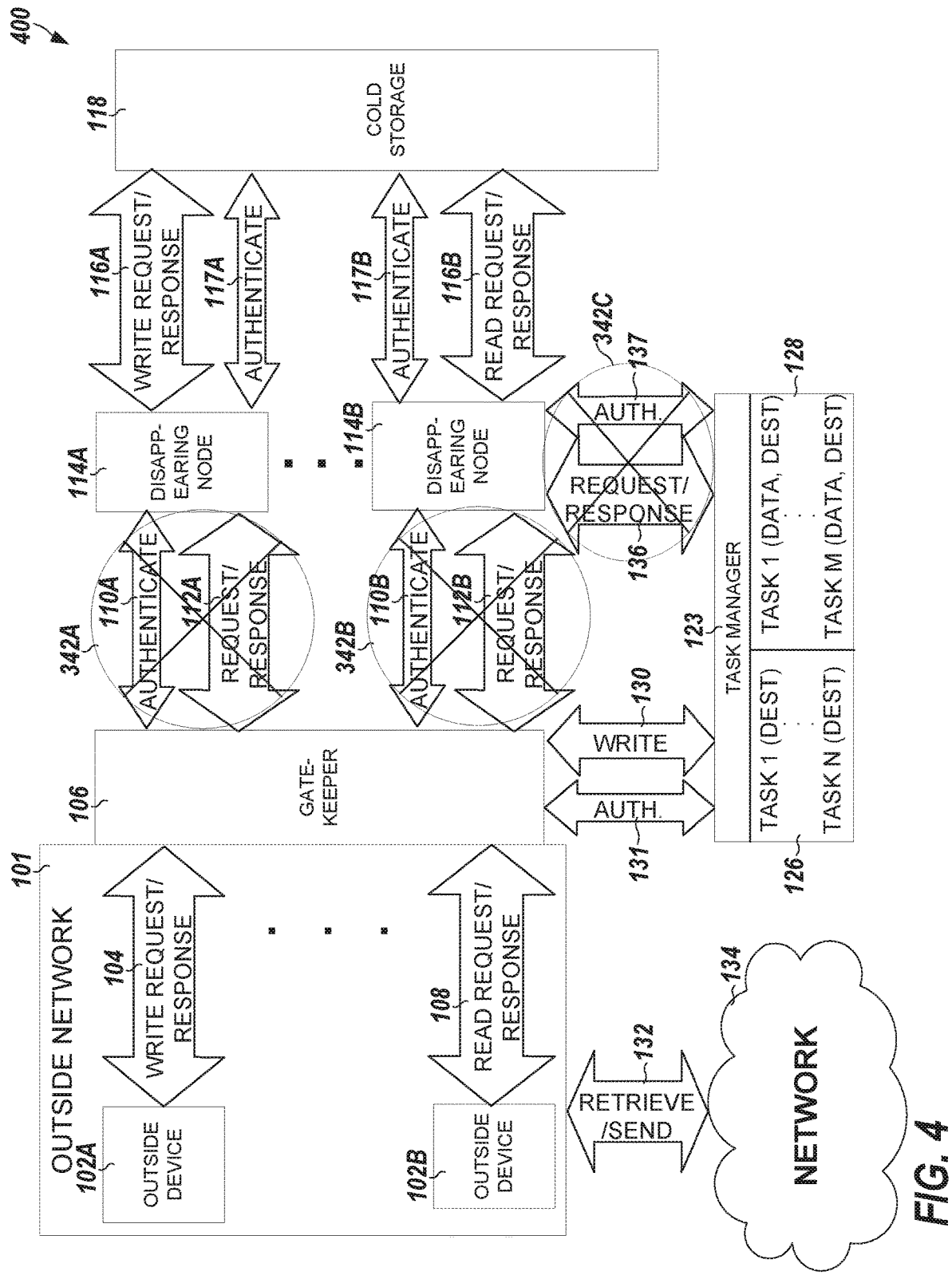
FIG. 4 illustrates, by way of example, a diagram of an embodiment of a system that includes the system in a task execution state.

FIG. 4 illustrates, by way of example, a diagram of an embodiment of a system 400 that includes the system 100 in a task execution state. The cold network 121 and the buffer network 119 are not illustrated in FIG. 4 so as to not obscure the view. See FIG. 1 for a view of these networks.

In the task execution state, the disappearing node 114A-114B is disconnected from the gatekeeper 106 and the buffer network 119. In the task execution state, the disappearing node 114A-114B is connected to the cold storage 118. In the task execution state, the disappearing node 114A-114B can perform an authentication request 117A-117B with the cold network 121. In the task execution state, the disappearing node 114A-114B can attempt to perform the task it retrieved from the task manager 123 or was issued by the gatekeeper 106.

In the task execution state, the cold storage 118 can perform an authentication request 117A-117B with the disappearing node 114A-114B. In the task execution state, the cold storage 118 can issue a response to a request 116A-116B from the disappearing node 114A-114B. The response, in case of a read request, can include data from a memory location specified in the request 116A-116B. The read request 116A-116B can include get, head, fetch, mget, or the like. The response, in case of write request, can include an indication of success or failure (e.g., ACK, TRUE, NACK, FALSE, or the like).

After the disappearing node 114A-114B completes (attempts whether successfully or unsuccessfully) the task, the system 400 can return to the disconnected state as illustrated in FIG. 3. After the system is in the disconnected state, the system can return to the task retrieval state, such as to indicate the disposition of the task in the memory 126, 128 to the outside network 101 via the gatekeeper 106 or buffer network 119. The disposition can include an indication of one or more of success, failure, or data, depending on whether the task was successfully completed, unsuccessful, or a read or write task. The disappearing node 114A-114B can then retrieve or be issued a new task, or the disappearing node 114A-114B can return to the disconnected state, as shown in FIG. 3.

In response to the gatekeeper 106 receiving an indication of success or data from the disappearing node 114A-114B, the gatekeeper can issue a command that causes an associated task to be removed from the memory 126, 128. In some embodiments, the gatekeeper 106 keeps a local copy of data to be written to the cold storage 118 from the outside device 102A-102B. In such embodiments, the gatekeeper 106 can delete the data to be written in response to a corresponding indication of success from the Disappearing node 114A-114B.

Note that the FIGS. illustrate multiple disappearing nodes 114A-114B in the respective task retrieval states. A more secure embodiment can include timing synchronization between the disappearing nodes 114A-114B, such that no disappearing nodes 114A-114B are in the task retrieval state shown in FIG. 2, while other disappearing nodes 114A-114B are in a task execution state shown in FIG. 4. In other embodiments, only one disappearing node 114A-114B is allowed to be connected to the gatekeeper 106, buffer network 119, the cold network 121, or the cold storage 118 at any given time. In such an embodiment, the access control policy enforced by the gatekeeper 106, buffer network 119, or cold network 121 can be configured to determine whether another disappearing node 114A-114B is connected or is attempting to connect. If the gatekeeper 106, buffer network 119, or cold storage 118 is connected to or attempting to connect to a disappearing node 114A-114B, the authentication request 110A-110B, 137, or 117A-117B can fail so that the disappearing node 114A-114B is not allowed to connect.

Figure 5:
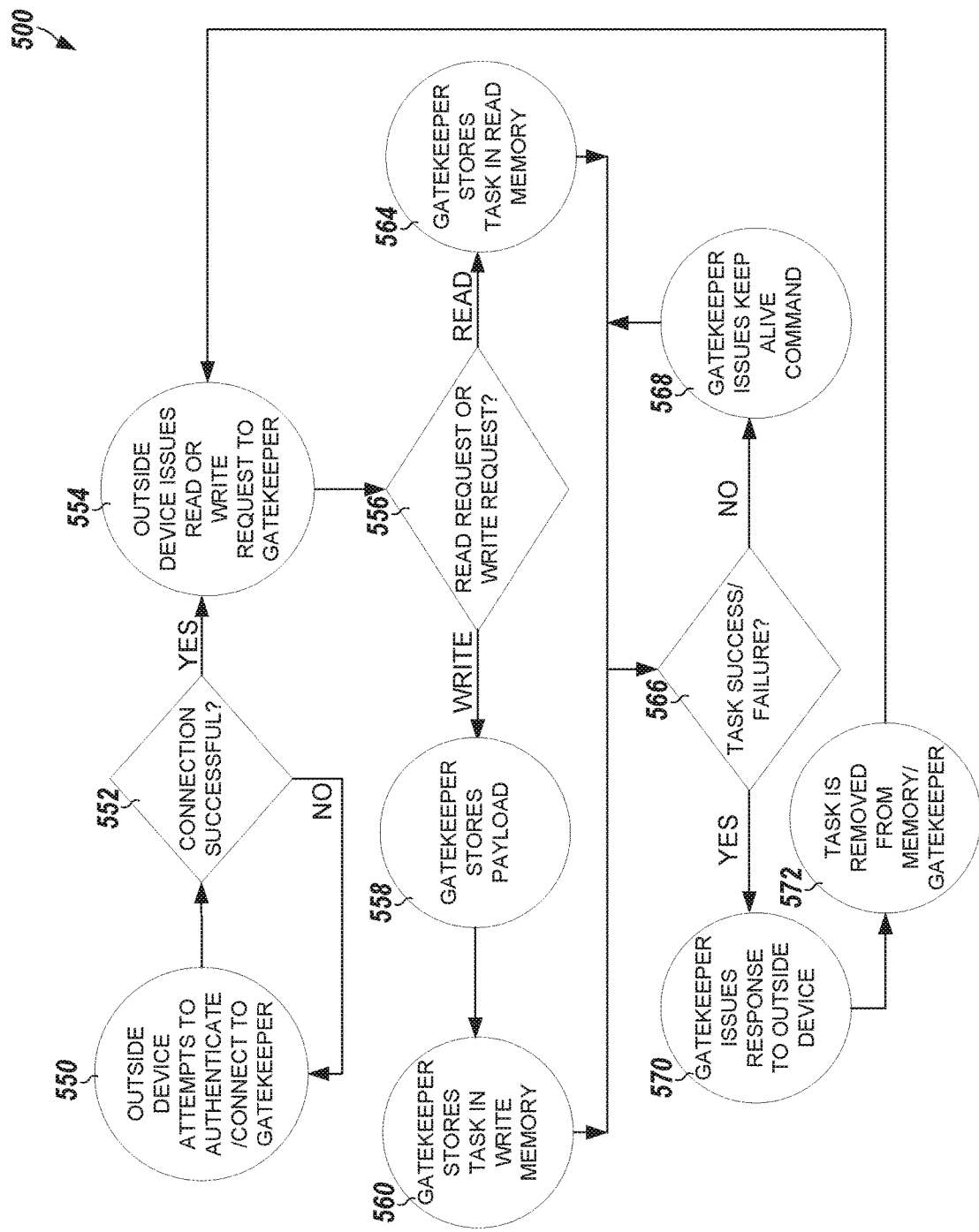
FIG. 5 illustrates, by way of example, a method for managing tasks for an online device to securely access offline data.

FIG. 5 illustrates, by way of example, a method 500 for managing tasks for an online device to securely access offline data. The method 500 as illustrated, includes the outside device 102A-102B attempting authentication or connection with the gatekeeper 106, at operation 550. The method 500 as illustrated further includes determining, at the outside device 102A-102B, whether the authentication or connection was successful, at operation 552. In response to a determination that the attempt was not successful, the outside device 102A-102B can attempt another authentication/connection to the gatekeeper 106 at operation 550. In response to a determination that the authentication/connection attempt was successful, the outside device 102A-102B can issue a write request 104 or a read request 108 to the gatekeeper 106, at operation 554.

At operation 556, the gatekeeper 106 can determine whether the request is a read request 108 or a write request 104. In response to a determination that the request is a write request 104, the gatekeeper 106 can store the payload of the write request 104 in a local memory device, at operation 558. Note that operation 558 is optional. There is no guarantee that the same disappearing node 114A-114B will re-attempt a failed write attempt to the cold storage 118 or that the data will persist in the write memory 128 until a next attempt to write the data. Thus, storing the write data locally can help assure that the data will be available for a next write attempt if needed. At operation 560, the gatekeeper 106 can issue a command (e.g., a PUT command) that causes the task to be stored in the write memory 128. The task can include task identification that can be used by the disappearing node 114A-114B to retrieve further task information from the gatekeeper 106, a payload in the case of the write request 108, a destination for the payload, an indication as to whether the request corresponds to a read request 104 or a write request 108, a time to live (TTL) for the task that indicates how long the task is to persist in the task manager 123 if it is not retrieved or deleted, among other data.

Sometime after operation 560 or 564, the gatekeeper 106 can determine whether the task is successfully complete or indicated as being unsuccessful, such as by receiving a NACK from the disappearing node 114A-114B, at operation 566. In response to a determination that the task is not indicated as being complete or unsuccessful, the gatekeeper 106 can issue a keep alive command to the task manager 123, at operation 568. The operation 566 can be executed periodically. The period can be less than the TTL of a task on the task manager 123, such that the TTL does not expire before the gatekeeper 106 can issue the keep alive command at operation 568.

At operation 570, in response to the gatekeeper 106 determining that the task is complete was attempted unsuccessfully, the gatekeeper 106 can issue a corresponding response to the outside device 102A-102B that issues the request at operation 554. The gatekeeper 106 can cause the task to be removed from the task manager 123 at operation 572, such as by issuing a delete command. The operations 570 and 572 can be executed in a different order, such as by executing the operation 572 before the operation 570 or executing the operations simultaneously or concurrently.

FIG. 6 illustrates, by way of example, a diagram of an embodiment of a method 600 for initialization of a disappearing node 114A-114B. The method 600 is illustrated from the perspective of the disappearing node 114A-114B. At operation 670, the disappearing node 114A-114B can power up, "spin up", be loaded, or otherwise become operable to communicate with the cold storage 118, the buffer network 119, or the gatekeeper 106. At operation 674, the disappearing node 114A-114B can read a configuration file that indicates the location of the gatekeeper 106, the task manager 123, the cold storage 118, or a cold storage directory that indicates the layout of the data on the cold storage 118.

The operation 674 can include the disappearing node 114A-114B authenticating/connecting to the cold storage, such as by performing the authentication request 117A-117B or connecting a port over which the write request 116A-116B is communicated. At operation 676, the disappearing node 114A-114B can read the cold storage directory to understand the address space of the cold storage 118. At operation 678, the disappearing node 114A-114B can disconnect from the cold storage 118. The operations 670 and 672 can be performed while the system 100 is in the disconnected state illustrated in FIG. 3. The operations 674, 676, and 678 can be performed while the system 100 is in the task execution state illustrated in FIG. 4.

FIG. 7 illustrates, by way of example, a diagram of an embodiment of a method 700 for securely communicating with offline storage, such as the cold storage 118 via the cold network 121. The method 700 is illustrated from the perspective of the disappearing node 114A-114B. The method 700 as illustrated includes the disappearing node 114A-114B authenticating/connecting to the buffer network 119 or the gatekeeper 106, such as by performing the authentication request 110A-110B or 137 or connecting to a communication channel over which the request 112A-112B is communicated.

At operation 782, the disappearing node 114A-114B can check the read memory 126 or the write memory 128 or consult a task schedule on the task manager 123, or the gatekeeper 106. The task schedule can include the task identification and an indication of an order in which to execute the tasks on the schedule. At operation 784, the disappearing node 114A-114B can determine if there are any tasks to be executed, such as by checking the memory 126, 128 or consulting the schedule. In response to determining there is no task to process, the disappearing node 114A-114B can perform operation 796. At operation 796, the disappearing node 114A-114B can disconnect from the buffer network 119. This disconnect makes the disappearing node 114A-114B disappear relative to the buffer network 119. That is, the buffer network 119 has no knowledge of the existence of the disappearing node 114A-114B.

In response to determining there is a task to process, the disappearing node 114A-114B can retrieve a task to be executed in accord with the schedule or the available task on the memory 126, 128, at operation 786. At operation 788, the disappearing node 114A-114B can disconnect from the buffer network 119 or the gatekeeper 106. The operations 780, 782, 784, 786, and 788 can be performed while the system 100 is in the task retrieval state illustrated in FIG. 2. After operation 788 or operation 784 if there are no tasks to process, the system 100 can be in the disconnected state as illustrated in FIG. 3.

At operation 790, the disappearing node 114A-114B can attempt to authenticate (e.g., through authentication request 117A-117B) or connect (e.g., establish a communication channel) to the cold network 121. If the authentication/connection is not successful, the disappearing node 114A-114B can attempt the authentication/connection again, such as after a specified period of time, or for a specified number of attempts. The disappearing node 114A-114B can attempt to execute the task on the cold storage 118, at operation 792. At operation 794, the disappearing node 114A-114B can disconnect (e.g., terminate or disable a communication channel, or the like) from the cold network 121. After operation 794, the system 100 is in the disconnected state as illustrated in FIG. 3. The operations 792 and 794 can be performed with the system 100 in the task execution state illustrated in FIG. 4.

FIG. 8 illustrates, by way of example, a block diagram of an embodiment of a system 800 for secure access to offline data. The system 800 as illustrated includes the system 100 without the disappearing Nodes 114A-114B and the buffer network 119. In this embodiment, the gatekeeper 106 receives the request/response 104, 108 while it is disconnected from the cold network 121. The gatekeeper 106 disconnects from the outside network 101 by disconnecting from all open communication channels to the outside network 101. At this point, the gatekeeper 106 is not connected to either of the networks 101 or 121. After the gatekeeper 106 is disconnected from the outside network 101, the gatekeeper can establish one or more communication channels with the cold network 121. The gatekeeper 106 can then execute the task on the cold storage 118 through the communication channel. After the task is attempted (successfully or failed) the gatekeeper 106 can disconnect from all communication channels to the cold network 121. At this point, the gatekeeper 106 is not connected to either of the networks 101 or 121. The gatekeeper 106 can then open a communication channel to the outside network 101 to indicate to an outside device 102A-102B, the result (e.g., success, failure, data, or the like).

Figure 9:
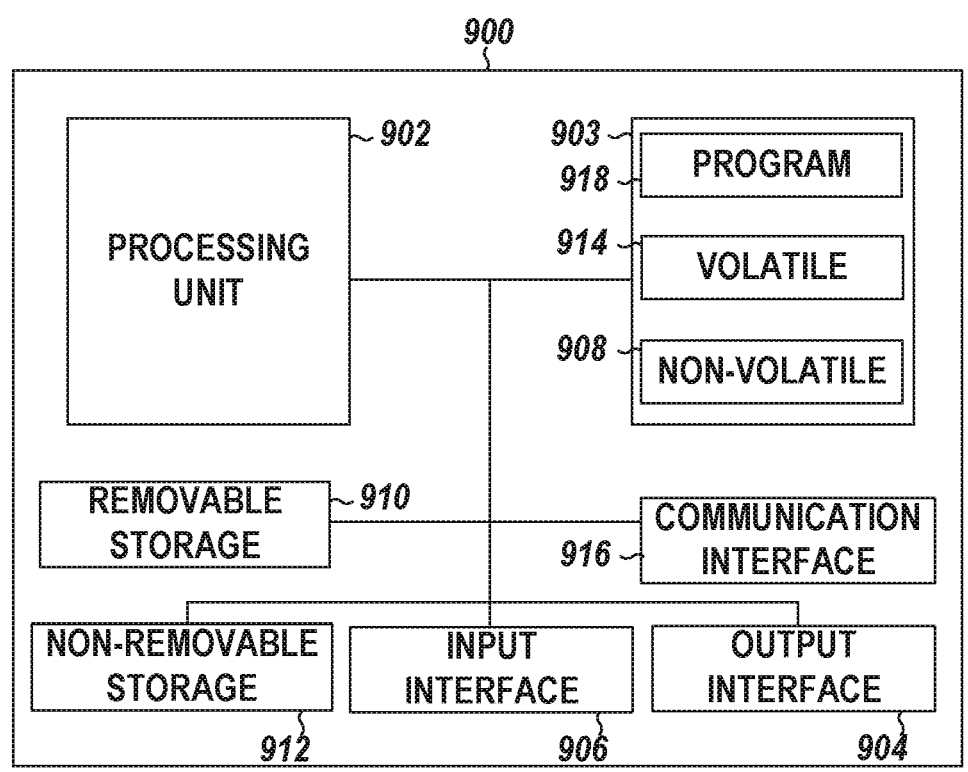
FIG. 9 illustrates, by way of example, a block diagram of an embodiment of a machine (e.g., a computer system) to implement one or more embodiments.

FIG. 9 illustrates, by way of example, a block diagram of an embodiment of a machine 900 (e.g., a computer system) to implement one or more embodiments. One or more of the outside device 102A-102B, outside network 101, gatekeeper 106, buffer network 119, disappearing node 114A-114B, cold network 121, or cold storage 118 can include or be implemented using one or more of the items of the machine 900.

One example machine 900 (in the form of a computer), can include a processing unit 902, memory 903, removable storage 910, and non-removable storage 912. Although the example computing device is illustrated and described as machine 900, the computing device can be in different forms in different embodiments. For example, the computing device can instead be a smartphone, a tablet, smartwatch, or other computing device including the same or similar elements as illustrated and described regarding FIG. 9. Devices such as smartphones, tablets, and smartwatches are generally collectively referred to as mobile devices. Further, although the various data storage elements are illustrated as part of the machine 900, the storage can also or alternatively include cloud-based storage accessible via a network, such as the Internet.

Memory 903 can include volatile memory 914 and non-volatile memory 908. The machine 900 can include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, programmable ROM (PROM), compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 900 can include or have access to a computing environment that includes input 906, output 904, and a communication connection 916. Output 904 can include a display device, such as a touchscreen, that also can serve as an input device. The input 906 can include one or more of a touchscreen, touchpad, mouse, keyboard, camera, one or more device-specific buttons, one or more sensors integrated within or coupled via wired or wireless data connections to the machine 900, and other input devices. The computer can operate in a networked environment using a communication connection to connect to one or more remote computers, such as database servers, including cloud based servers and storage. The remote computer can include a personal computer (PC), server, router, network PC, a peer device or other common network node, or the like. The communication connection can include a Local Area Network (LAN), a Wide Area Network (WAN), cellular, Institute of Electrical and Electronics Engineers (IEEE) 802.11 (Wi-Fi), Bluetooth, or other network interfaces, devices, or adapters.

Computer-readable instructions stored on a computer-readable storage device are executable by the processing unit 902 of the machine 900. A hard drive, compact disc (CD)-ROM, and random access memory (RAM) are some examples of articles including a non-transitory computer-readable medium such as a storage device. For example, a computer program 918 can be used to cause processing unit 902 to perform one or more methods or algorithms described herein.

Embodiments can operate in conjunction with or integrate with other security infrastructures, thus allowing a user to deploy multiple security products alongside embodiments. This allows other security products to bolster the security of embodiments. For example, there are locations for traffic-related information security solutions. Embodiments do not impede implementation of traffic-related security solutions such as Firewalls, intrusion prevention system (IPS), intrusion detection system (IDS), taps, secure socket layer (SSL) Decryption, etc. Additional traffic-related solutions may be deployed between the outside network 101 and the buffer network 119, or the cold storage device 118 and the buffer network 119. A traffic-related solution deployed between the outside network 101 and the gatekeeper 106 can be used to inspect/detect/copy/re-direct/optimize any traffic before it is allowed to reach the gatekeeper 106. A traffic-related solution deployed between the gatekeeper 106 and the disappearing node 114A-114B can help ensure that communication is limited to occur over only authorized communication channels. A traffic-related solution between the disappearing Node 114A-114B and the cold storage device 118 can be used as a last barrier of defense in the event of a severe compromise.

Additionally, or alternatively, embodiments can include host-based information security solutions. Host-based security solutions can include anti-malware, anti-virus, anti-spyware, next generation anti-virus (NGAV), application whitelisting, incident response, or the like. Possible locations for host-based security solutions include on the gatekeeper 106, the disappearing node 114A-114B, or the cold storage device 118, among others.

Additionally, or alternatively, embodiments can include logging sources, such as for security information and event management (SIEM)/security information management (SIM)/security event management (SEM) security solutions. Possible locations for logging solutions include on the gatekeeper 106, the disappearing node 114A-114B, or the cold storage device 118, on another device, among others.

Additionally, or alternatively, embodiments can operate using one or more of a variety of data transfer protocols. The communication channels, over which the write request/response 104, read request/response 108, authentication request 110A-110B, request/response 112A-112B, write command 130, authentication request 131, authentication request 137, request/response 136, authentication request 117A-117B, write request/response 116A, or read request response 116B are provided, operates using a data transfer protocol. Examples of application layer data transfer protocols include BitTorrent, CCSDS File Delivery Protocol, Cross File Transfer, EForward, Ether File Transfer Protocol, Fast and Secure Protocol, Structured Query Language, File Delivery over Unidirectional Transport, File Service Protocol, File Transfer Access and Management, File Transfer Protocol, FTP Secure, HTTP Secure, Host Unix Linkage File Transfer, Hypertext Transfer Protocol, Micro Transport Protocol, Multicast Dissemination Protocol, Multicast File Transfer Protocol, NACK-Oriented Reliable Multicast Transport Protocol, Odette File Transfer Protocol, Odette File Transfer Protocol 2, Reliable Blast UDP, Remote copy, Secure copy, Secure Hypertext Transfer Protocol, Simple Asynchronous File Transfer, Simple File Transfer Protocol, SSH file transfer protocol, T.127, Trivial File Transfer Protocol, Tsunami UDP Protocol, UDP-based Data Transfer Protocol, UDP-based File Transfer Protocol, Unix-to-Unix Copy, Warp Speed Data Transfer, or the like, among others. Examples of transport layer data transfer protocols include TCP and UDP, among others. Examples of network layer data transfer protocols include IPv4, IPv6, and IPSEC, among others.

Additional Notes and Examples

Example 1 includes a device configured to provide secure access to offline data, the device comprising a processor, and a memory device including instructions embodied thereon, wherein the instructions, which when executed by the processor, cause the processor to perform operations comprising establish a first communication channel with a buffer network, the buffer network situated between an outside network and a cold storage device such that all communications between the cold storage device and the outside network go through the buffer network, retrieve a task from the buffer network over the first communication channel, the task indicating an operation to be performed on the cold storage device, disable communication over the first communication channel, establish a second communication channel with the cold storage device after the first communication channel is disabled, execute the operation on the cold storage device over the second communication channel, disable communication over the second communication channel, re-establish the first communication channel with the buffer network after the second communication channel is disabled, and provide data indicating a result of executing the task to the buffer network.

In Example 2, Example 1 can further include, wherein establishing the first communication channel includes authenticating with the buffer network.

In Example 3, Example 2 can further include, wherein authenticating with the buffer network occurs on a different port than retrieving the task.

In Example 4 at least one of Examples 1-3 can further include, wherein establishing the second communication channel includes authenticating with a cold storage network to which the cold storage device is connected.

In Example 5, Example 4 can further include, wherein authenticating with the cold storage device occurs on a different port than executing the task.

In Example 6, at least one of Examples 1-5 can further include, wherein the buffer network includes a memory on which the task is stored.

In Example 7, Example 6 can further include, wherein the task manager has a first queue to store read tasks indicating memory locations from which to retrieve data from the cold storage device and includes a second queue to store write tasks indicating respective payloads and respective memory locations of the cold storage device to which to write the payloads.

In Example 8, at least one of Examples 1-7 can further include, wherein the device is configured to refrain from having the first and second communication channels established concurrently.

In Example 9, at least one of Examples 1-8 can further include, wherein the data indicating the result includes data indicating that the task was completed successfully, data retrieved from the cold storage device, or data indicating that execution of the task was unsuccessful, and a task identification associated with the task.

In Example 10, at least one of Examples 1-9 can further include, wherein the cold storage device is configured to never be communicatively coupled to a network other than the cold network.

Example 11 can further include a device comprising processing circuitry, and a memory device including instructions embodied thereon, wherein the instructions, which when executed by the processing circuitry, cause the processing circuitry to perform operations comprising configure the device in a task retrieval state and retrieve a task to be executed on a cold storage device while the device is in the task retrieval state, configure the device in a disconnected state after retrieving the task, and configure the device in a task execution state after the device is in the disconnected state and execute the task on the cold storage while the device is in the task execution state.

In Example 12, Example 11 can further include, wherein the memory includes further instructions that, when executed by the processing circuitry, further cause the processing circuitry to configure the device in the disconnected state after executing the task.

In Example 13, at least one of Examples 11-12 can further include, wherein the memory includes further instructions that, when executed by the processing circuitry, further cause the processing circuitry to configure the device in the task retrieval state after the device is in the disconnected state and provide a result of the execution to a buffer network while the device is in the task retrieval state.

In Example 14, at least one of Examples 11-13 can further include, wherein, in the task retrieval state, the device communicates with a buffer network through which an outside device of an outside network must communicate through to cause the task to be executed on the cold storage and a communication channel between the device and the cold storage device is disabled.

In Example 15, at least one of Examples 11-14 can further include, wherein, in the disconnected state, a communication channels between the device and the buffer network are disabled and a communication channel between the device and the cold storage is disabled.

In Example 16, at least one of Examples 11-15 can further include, wherein, in the task execution state, the device communicates with the cold storage device and a communication channel between the device and the buffer network is disabled.

In Example 17, Example 16 can further include, wherein the memory includes further instructions that, when executed by the processing circuitry, further cause the processing circuitry to disable the communication channel between the device and the buffer network or the communication channel between the device and the cold storage device.

Example 18 includes a device configured to provide secure access to offline data, the device comprising a processor, and a memory device including instructions embodied thereon, wherein the instructions, which when executed by the processor, cause the processor to perform operations comprising establish a first communication channel with an outside network, the device situated between an outside network and a cold network such that all communications between the cold network and the outside network go through the device, receive a task from the outside network over the first communication channel, the task indicating an operation to be performed on a cold storage device on the cold network, disable communication over the first communication channel, establish a second communication channel with the cold network after the first communication channel is disabled, execute the operation on the cold storage device over the second communication channel, disable communication over the second communication channel, re-establish the first communication channel with the outside network after the second communication channel is disabled, and provide data indicating a result of executing the task to the outside network.

In Example 19, Example 18 can further include, wherein establishing the first communication channel includes authenticating with the outside network.

In Example 20, Example 19 can further include, wherein authenticating with the outside network occurs on a different port than retrieving the task.

In Example 21, at least one of Examples 18-20 can further include, wherein establishing the second communication channel includes authenticating with the cold network.

In Example 22, Example 21 can further include, wherein authenticating with the cold network occurs on a different port than providing the task to be executed.

In Example 23, at least one of Examples 18-22 can further include, wherein the device is configured, through operation of the processor, to refrain from having the first and second communication channels established concurrently.

In Example 24, at least one of Examples 18-23 can further include, wherein the data indicating the result includes data indicating that the task was completed successfully, data retrieved from the cold storage device, or data indicating that execution of the task was unsuccessful, and a task identification associated with the task.

In Example 25, at least one of Examples 18-24 can further include, wherein the cold storage device is configured to never be communicatively coupled to a network other than the cold network.

Example 26 includes a non-transitory machine-readable storage medium, the machine-readable storage medium including instructions that, when executed by a machine, causes the machine to perform operations of the processor of at least one of Examples 1-10 or 18-25, or the processing circuitry of at least one of Examples 11-17.

Example 27 includes a method performed by a computing device, the method including operations of the processor of at least one of Examples 1-10 or 18-25, or the processing circuitry of at least one of Examples 11-17.

Example 28 includes a system including the device of at least one of Examples 1-10 or 18-25, or at least one of Examples 11-17.

As used herein "or" means the inclusive sense such that "A or B" means any one of "A", "B", and "A and B". Similarly, a "-" represents an inclusive or such that "114A-114B" means any of "114A", "114B", and "114A-114B".

Although a few embodiments have been described in detail above, other modifications are possible. For example, the logic flows depicted in the figures do not require the order shown, or sequential order, to achieve desirable results. Other steps can be provided, or steps can be eliminated, from the described flows, and other components can be added to, or removed from, the described systems. Other embodiments can be within the scope of the following claims.

What is claimed is:

1. A device configured to provide secure access to offline data, the device comprising:
   a processor; and
   a memory device including instructions embodied thereon, wherein the instructions, which when executed by the processor, cause the processor to perform operations comprising:
   while communication is disabled between the device and a cold storage device, establish a first communication channel with a buffer network, the buffer network situated between an outside network and a cold storage device, the buffer network situated between the device and a gatekeeper that performs access control for the cold storage device, and the buffer network situated between the device and a task manager, such that all communications between the cold storage device and the outside network go through the buffer network, all communications between the device and the gatekeeper go through the buffer network, and all communications between the device and the task manager go through the buffer network;
   retrieve a task from the task manager through the buffer network and over the first communication channel, the task indicating an operation to be performed on the cold storage device;
   disable communication over the first communication channel and other communication channels between the buffer network and the device such that the device has no open communication channels;

establish a second communication channel with the cold storage device after the first communication channel and other communication channels between the buffer network and the device are disabled;

execute the operation on the cold storage device over the second communication channel;

disable communication over the second communication channel;

re-establish the first communication channel with the buffer network after the second communication channel is disabled; and provide data indicating a result of executing the task to the buffer network.

2. The device of claim 1, wherein establishing the first communication channel includes authenticating with the buffer network.

3. The device of claim 2, wherein authenticating with the buffer network occurs on a different port than retrieving the task.

4. The device of claim 1, wherein establishing the second communication channel includes authenticating with a cold storage network to which the cold storage device is connected.

5. The device of claim 4, wherein authenticating with the cold storage device occurs on a different port than executing the task.

6. The device of claim 1, wherein the task manager has a first queue to store read tasks indicating memory locations from which to retrieve data from the cold storage device and includes a second queue to store write tasks indicating respective payloads and respective memory locations of the cold storage device to which to write the payloads.

7. The device of claim 1, wherein the device is configured to refrain from having the first and second communication channels established concurrently.

8. The device of claim 1, wherein the data indicating the result includes data indicating that the task was completed successfully, data retrieved from the cold storage device, or data indicating that execution of the task was unsuccessful, and a task identification associated with the task.

9. The device of claim 4, wherein the cold storage device is configured to never be communicatively coupled to a network other than the cold storage network.

10. A device comprising:
processing circuitry; and
a memory device including instructions embodied thereon, wherein the instructions, which when executed by the processing circuitry, cause the processing circuitry to perform operations comprising:
configure the device in a task retrieval state such that the device is communicatively connected only to a buffer network;
retrieve, from a task manager and throw: h the buffer network, a task to be executed on a cold storage device while the device is in the task retrieval state;
configure the device in a disconnected state after retrieving the task, in the disconnected state the device is communicatively connected to no other devices including the cold storage device and the buffer network;
configure the device in a task execution state after the device is in the disconnected state, in the task execution state the device is communicatively connected only to the cold storage device; and
execute the task on the cold storage device while the device is in the task execution state.

11. The device of claim 10, wherein the memory includes further instructions that, when executed by the processing circuitry, further cause the processing circuitry to configure the device in the disconnected state after executing the task.

12. The device of claim 11, wherein the memory includes further instructions that, when executed by the processing circuitry, further cause the processing circuitry to configure the device in the task retrieval state after the device is in the disconnected state and provide a result of the execution to a buffer network while the device is in the task retrieval state.

13. The device of claim 10, wherein, in the task retrieval state, the device communicates with the buffer network through which an outside device of an outside network must communicate through to cause the task to be executed on the cold storage and a communication channel between the device and the cold storage device is disabled.

* * * * *